US012042809B2

(12) United States Patent
Zuber et al.

(10) Patent No.: US 12,042,809 B2
(45) Date of Patent: Jul. 23, 2024

(54) AEROSOL-GENERATING SYSTEM COMPRISING A VIBRATABLE ELEMENT

(71) Applicant: Altria Client Services LLC, Richmond, VA (US)

(72) Inventors: Gerard Zuber, Froideville (CH); Samuel Bonnely, Cormondreche (CH)

(73) Assignee: Altria Client Services LLC, Richmond, VA (US)

( * ) Notice: Subject to any disclaimer, the term of this patent is extended or adjusted under 35 U.S.C. 154(b) by 176 days.

(21) Appl. No.: 15/340,032

(22) Filed: Nov. 1, 2016

(65) Prior Publication Data

US 2017/0119059 A1 May 4, 2017

Related U.S. Application Data

(63) Continuation of application No. PCT/EP2016/074425, filed on Oct. 12, 2016.

(30) Foreign Application Priority Data

Nov. 2, 2015 (EP) .................................... 15192636

(51) Int. Cl.
*B05B 17/06* (2006.01)
*A24F 40/05* (2020.01)
(Continued)

(52) U.S. Cl.
CPC .......... *B05B 17/0607* (2013.01); *A24F 40/05* (2020.01); *A24F 40/42* (2020.01);
(Continued)

(58) Field of Classification Search
CPC .... A24F 47/008; A24F 47/00; B05B 17/0607; B05B 17/0623; B05B 17/0646;
(Continued)

(56) References Cited

U.S. PATENT DOCUMENTS

| | | | | |
|---|---|---|---|---|
| 6,427,682 B1 * | 8/2002 | Klimowicz ......... | A61M 15/025 128/200.14 |
| 6,530,370 B1 * | 3/2003 | Heinonen ............ | A61M 11/005 128/200.14 |

(Continued)

FOREIGN PATENT DOCUMENTS

| | | |
|---|---|---|
| CN | 1579270 A | 2/2005 |
| CN | 101116542 A | 2/2008 |

(Continued)

OTHER PUBLICATIONS

European Search Report Application No. 15192636.7 dated May 23, 2016.

(Continued)

*Primary Examiner* — Helena Kosanovic
*Assistant Examiner* — Tiffany T Tran
(74) *Attorney, Agent, or Firm* — Harness, Dickey & Pierce, P.L.C.

(57) ABSTRACT

An aerosol-generating system includes a liquid-storage portion including a housing configured to store a liquid aerosol-forming substrate. The aerosol-generating system also includes a heater configured to heat liquid aerosol-forming substrate, a vibratable element including a plurality of passages through which the heated liquid aerosol-forming substrate passes to form an aerosol, and an actuator arranged to vibrate the vibratable element to generate the aerosol.

24 Claims, 3 Drawing Sheets

(51) Int. Cl.

| | |
|---|---|
| ***A24F 40/42*** | (2020.01) |
| ***A24F 40/46*** | (2020.01) |
| ***A24F 40/485*** | (2020.01) |
| *A24F 40/10* | (2020.01) |

(52) U.S. Cl.
CPC ............ *A24F 40/46* (2020.01); *A24F 40/485* (2020.01); *A24F 40/10* (2020.01)

(58) Field of Classification Search
CPC . B05B 17/0676; B05B 17/06; B05B 17/0684; B05B 12/08; A61M 11/005; A61M 11/042; A61M 15/0003; A61M 15/0065; A61M 15/0066; A61M 15/008; A61M 15/0083; A61M 15/0085; A61M 15/06; A61M 2016/0021; A61M 2016/0024; A61M 2205/3306; A61M 2205/3368; A61M 2205/3375; A61M 2205/502; A61M 2205/583; A61M 2205/8206
USPC ....... 128/202.21, 203.14; 392/387, 394, 397, 392/404, 402; 239/338, 102.2, 360, 375, 239/1, 102.1, 124, 340, 352, 4
See application file for complete search history.

(56) References Cited

U.S. PATENT DOCUMENTS

| | | | | |
|---|---|---|---|---|
| 6,540,153 | B1 * | 4/2003 | Ivri | A61M 11/005 239/102.2 |
| 6,629,646 | B1 * | 10/2003 | Ivri | A61M 11/005 239/102.2 |
| 7,131,599 | B2 | 11/2006 | Katase | |
| 8,555,874 | B2 * | 10/2013 | Fink | A61M 16/06 261/78.2 |
| 8,833,364 | B2 | 9/2014 | Buchberger | |
| 9,108,211 | B2 * | 8/2015 | Ivri | A61M 15/00 |
| 2004/0256487 | A1 * | 12/2004 | Collins, Jr. | A61M 11/005 239/338 |
| 2005/0201870 | A1 * | 9/2005 | Koerner | B05B 17/0646 417/322 |
| 2005/0279854 | A1 * | 12/2005 | Martens, III | B05B 17/0646 239/44 |
| 2006/0255174 | A1 * | 11/2006 | Ivri | B05B 17/0646 239/102.2 |
| 2008/0230052 | A1 * | 9/2008 | Montaser | A61M 15/0085 128/200.16 |
| 2009/0134235 | A1 * | 5/2009 | Ivri | B05B 17/0676 29/25.35 |
| 2012/0048266 | A1 * | 3/2012 | Alelov | A61M 11/005 128/202.21 |
| 2012/0111970 | A1 * | 5/2012 | Hogan | A61M 11/001 239/102.2 |
| 2012/0118283 | A1 * | 5/2012 | Papania | A61M 15/0066 128/200.14 |
| 2012/0199663 | A1 | 8/2012 | Qiu | |
| 2013/0026250 | A1 * | 1/2013 | Burt | A01M 1/205 239/302 |
| 2014/0144453 | A1 | 5/2014 | Capuano et al. | |
| 2014/0151461 | A1 * | 6/2014 | Sasaki | B05B 17/0646 239/102.2 |
| 2014/0321837 | A1 * | 10/2014 | Flick | A61M 15/06 392/394 |
| 2015/0027471 | A1 | 1/2015 | Feldman et al. | |
| 2015/0069146 | A1 * | 3/2015 | Lowy | B05B 15/58 239/102.2 |
| 2015/0129681 | A1 * | 5/2015 | Kawano | A61L 9/14 239/102.2 |
| 2015/0306623 | A1 * | 10/2015 | Kawano | A01M 1/205 239/102.2 |
| 2016/0106153 | A1 * | 4/2016 | Zhu | A24F 47/008 131/329 |
| 2016/0310981 | A1 * | 10/2016 | Von Hollen | B05B 17/0646 |
| 2016/0338407 | A1 * | 11/2016 | Kerdemelidis | A24F 47/008 |
| 2018/0178240 | A1 * | 6/2018 | Anzenberger | A61M 11/005 |

FOREIGN PATENT DOCUMENTS

| | | | |
|---|---|---|---|
| CN | 201051862 | Y | 4/2008 |
| CN | 101390659 | A | 3/2009 |
| CN | 101986906 | A | 3/2011 |
| CN | 201781984 | U | 4/2011 |
| CN | 203040683 | | 7/2013 |
| CN | 103338663 | A | 10/2013 |
| CN | 103859604 | A | 6/2014 |
| CN | 204070562 | U | 1/2015 |
| CN | 104397881 | A | 3/2015 |
| CN | 104983078 | A | 10/2015 |
| EP | 1005917 | A1 | 6/2000 |
| EP | 1736065 | A1 | 12/2006 |
| EP | 2340729 | A1 | 7/2011 |
| EP | 2493342 | A1 | 9/2012 |
| EP | 2493342 | B1 | 12/2014 |
| EP | 2891414 | A2 | 7/2015 |
| JP | H04-279172 | A | 10/1992 |
| JP | 2007-512880 | A | 5/2007 |
| JP | 2010-240506 | A | 10/2010 |
| JP | 2013-230109 | A | 11/2013 |
| JP | 2014113536 | A | 6/2014 |
| JP | 2015-504653 | A | 2/2015 |
| KR | 10-2013-0057342 | A | 5/2013 |
| KR | 10-2014-0044165 | A | 4/2014 |
| RU | 2013126199 | A | 12/2014 |
| TW | 201433272 | A | 9/2014 |
| TW | 1473574 | B | 2/2015 |
| WO | WO-97/048293 | A1 | 12/1997 |
| WO | WO-2000050111 | A1 | 8/2000 |
| WO | WO-03059413 | A3 | 11/2003 |
| WO | WO-2004103478 | A1 | 12/2004 |
| WO | WO-2011050964 | A1 | 5/2011 |
| WO | WO-2012062600 | A1 | 5/2012 |
| WO | WO-2015/013135 | A1 | 1/2015 |
| WO | WO-2015117700 | A1 | 8/2015 |

OTHER PUBLICATIONS

O'Callaghan and Barry, The Science of Nebulised Drug Delivery, Thorax 52(Suppl 2), 1997, S31-S44.
McCallion et al. Nebulization of Fluids of Different Physicochemical Properties with Air-Jet and Ultrasonic Nebulizers, Pharmaceutical Research, 1995, 1682-1688.
McCallion et al. Ultrasonic Nebulisation of Fluids with Different Viscosities and surface Tensions, Journal of Aerosol Medicine, 1995, 281-285.
Chemmalasseri, Numerical modelling of droplet formation in mesh nebulizers. Master Thesis Mechanical Engineering, 2012, Laboratory for aero & hydrodynamics, TU Delft, The Netherlands, 1-105.
Vecellio, "The mesh nebuliser: A recent technical innovation for aerosol delivery", INSERM U-618, 2006, 253-260.
International Search Report for International Application No. PCT/EP2016/074425 dated Jan. 24, 2017.
Russian Decision to Grant and Search Report for corresponding Application No. 2018120358, dated Oct. 29, 2019, English translation thereof.
Taiwanese Office Action and Search Report for corresponding Application No. 105134288, dated Apr. 30, 2020.
Chinese Office Action for corresponding Application No. 201680059188.4, dated May 28, 2020.
Notice of Grounds for Rejection issued Sep. 17, 2020 in Japanese Application No. P2018 521875.
Extended European Search Report dated Jan. 25, 2021 for corresponding European Application No. 20199094.2.
Chinese Office Action dated Feb. 20, 2021 for corresponding Chinese Application No. 201680059188.4, and English-language translation thereof.
Israeli Office Action for corresponding Application No. 258142, dated Jun. 28, 2021.

(56) References Cited

OTHER PUBLICATIONS

Office Action dated Mar. 29, 2021 issued in corresponding Japanese Patent Application No. 2018-521875.
Chinese Notice of Allowance dated Oct. 20, 2021 for corresponding Chinese Application No. 201680059188.4, and English-language translation thereof.
Canadian Office Action for corresponding Application No. 3,003,056, dated Sep. 21, 2022.
Japanese Office Action for corresponding Application No. 2021-124437, dated Oct. 19, 2022, English translation included.
Russian Office Action for corresponding Application No. 2020101181, dated Feb. 28, 2023, with English Translation.
Korean Office Action for Application No. 10-2018-7010080, dated Jul. 13, 2023, with English Translation included.
Russian Notice of Allowance for Application No. 2020101181/03(001704), dated Aug. 1, 2023, with English Translation.
Decision of Refusal dated Aug. 3, 2023 issued in related Japanese patent application No. 2021-124437.
Notice of Allowance dated Jan. 24, 2024 issued in related Korean patent application No. 2018-7010080.

* cited by examiner

AEROSOL-GENERATING SYSTEM COMPRISING A VIBRATABLE ELEMENT

This is a continuation of and claims priority to PCT/EP2016/074425 filed on Oct. 12, 2016, and further claims priority to EP 15192636.7 filed on Nov. 2, 2015; both of which are hereby incorporated by reference in their entirety.

BACKGROUND

Some example embodiments relate to aerosol-generating systems, cartridges for aerosol-generating systems and atomizers comprising a vibratable element for atomizing a liquid aerosol-forming substrate. The aerosol-generating system may be an electrically operated vaping system.

One type of aerosol-generating system is an electrically operated vaping system. Electrically operated vaping systems typically use a liquid aerosol-forming substrate which is atomised to form an aerosol. Electrically operated vaping systems may comprise a power supply, a liquid-storage portion for holding a supply of liquid aerosol-forming substrate and an atomiser. A type of atomizer used in electronically operated vaping systems comprises a coil of heater wire wound around an elongate wick soaked in liquid aerosol-forming substrate.

Other types of atomizers may use ultrasonic vibrations, rather than heat, to atomize a liquid substrate. There are two types of atomizers that use ultrasonic vibrations to atomize a liquid substrate, which are referred to herein as ‘active’ and ‘passive’ ultrasonic atomizers. ‘Passive’ ultrasonic atomisers use an oscillating element to transmit vibrations to a liquid substrate. The vibrations generate pressure waves in the liquid substrate that push the substrate through a fine mesh or a narrow region to atomize the liquid. ‘Active’ ultrasonic atomizers use a vibrating mesh through which a liquid substrate is drawn and atomized by the vibrations.

Ultrasonic atomizers may produce aerosols having a more consistent droplet size than atomizers that use heat to atomize a liquid substrate. Ultrasonic atomizers may also generate aerosols having a lower temperature than atomizers that use heat to atomize a liquid substrate. Some atomizers may not be able to atomize highly viscous liquids. In addition, some ultrasonic atomizers for use in electrically operated vaping systems may not generate an aerosol at a temperature that provides an adult vaper with a mouthfeel that is similar to that of the smoke from a cigarette or cigar.

It would be desirable to provide an aerosol-generating system that is configured to atomize a range of liquid aerosol-forming substrates, having a range of viscosities. It would also be desirable to provide an electrically operated vaping system having an improved atomizer.

SUMMARY

At least one example embodiment relates to an aerosol-generating system comprising a liquid-storage portion. The liquid-storage portion comprises a housing for holding a liquid aerosol-forming substrate and a heater arranged to heat the liquid aerosol-forming substrate. The aerosol-generating system further comprises a vibratable element comprising a plurality of passages through which the heated liquid aerosol-forming substrate may pass to form an aerosol, and an actuator arranged to vibrate the vibratable element to generate the aerosol.

During vaping, an adult vaper may operate the system by operating a switch or by drawing on a mouthpiece of the system. The heating means may be activated thereby heating at least a portion of the liquid aerosol-forming substrate. The actuator may be activated, exciting vibrations in the vibratable element. The vibrations in the vibratable element may deform the vibratable element and the passages of the plurality of passages. Heated liquid aerosol-forming substrate may be received by the vibratable element at an inlet side. The deformation of the passages may draw the received, heated liquid aerosol-forming substrate into the passages and may eject aerosol droplets of the liquid aerosol-forming substrate from an opposing outlet side of the element, atomising the liquid aerosol-forming substrate.

The viscosity of a liquid aerosol-forming substrate may have a significant effect on the flow-rate of the liquid through the aerosol-generating system. Reducing the viscosity of the liquid aerosol-forming substrate may increase the flow-rate and increases the rate of atomization. As used herein, the term ‘rate of atomization’ describes the rate of generation of aerosol from the system. In other words, the ‘rate of atomization’ is the difference between the initial mass of aerosol-forming substrate held in the liquid storage portion and the remaining aerosol-forming substrate held in the liquid storage portion divided by the atomization time.

The heater may heat the liquid aerosol-forming substrate and reduce the viscosity of the liquid aerosol-forming substrate. By heating the liquid aerosol-forming substrate before atomization, the heater may increase the rate of atomization. Heating the aerosol-forming substrate and reducing the viscosity of the aerosol-forming substrate before atomisation may also increase the reliability of the system.

The heater may heat the liquid aerosol-forming substrate to a consistent, desired (or, alternatively a predetermined) temperature before atomization. This enables atomization of the liquid aerosol-forming substrate at a substantially consistent viscosity, and may enable generation of an aerosol by the system at a substantially consistent rate of atomization. This may improve the vaper experience.

The viscosity of the liquid aerosol-forming substrate may have a significant effect on the droplet size of the aerosol generated by the system. Therefore, heating the liquid aerosol-forming substrate to a consistent, desired (or, alternatively a predetermined) temperature before atomization may facilitate generation of an aerosol having a consistent distribution of droplet sizes.

Heating the liquid aerosol-substrate to a temperature above ambient temperature before atomization may also reduce the sensitivity of the system to fluctuations in ambient temperature and provide an adult vaper with a consistent aerosol at each use.

As used herein, the term ‘droplet size’ is used to mean the aerodynamic droplet size, which is the size of a spherical unit density droplet that settles with the same velocity as the droplet in question. Several measures are used in the art to describe aerosol droplet size. These include mass median diameter (MMD) and mass median aerodynamic diameter (MMAD). As used herein, the term ‘mass median diameter (MMD)’ is used to mean the diameter of a droplet such that half the mass of the aerosol is contained in small diameter droplets and half in large diameter droplets. As used herein, the term ‘mass median aerodynamic diameter (MMAD) is used to mean the diameter of a sphere of unit density that has the same aerodynamic properties as a droplet of median mass from the aerosol.

There are several methods of measuring droplet size that are well-known in the art, in particular using laser based light scattering devices and inertial impaction devices. Laser diffraction devices may not detect aerodynamic droplet size.

Inertial impaction devices may detect aerodynamic droplet size and allow the amount of liquid contained in the droplets to be calculated. Example inertial impaction devices include the glass multistage liquid impinger, the Anderson impactor, the high performance multistage liquid impinge and the twin stage impingers.

The mass median aerodynamic diameter (K, MAD) of the droplets generated by the aerosol-generating system of the present invention may range from about 1 μm to about 10 μm, or the MMAD may be range from about 1 μm to about 5 μm. The MMAD of the droplets may be equal to or less than about 3 μm. The desired droplet size of the droplets generated by the aerosol-generating system may be any MMAD described above. The desired droplet size (MMAD) may be equal to or less than about 3 μm.

The heater may be any suitable heater capable of heating a liquid aerosol-forming substrate. The heater may be an electrically operated heater. The heater may be a resistive heater.

The heater may be arranged on or within the housing of the liquid-storage portion. This may improve heat transfer between the heater and the liquid aerosol-forming substrate.

The heater may be arranged at the vibratable element. The heater may be in a heat conductive relationship with the vibratable element.

The heater may be substantially flat to allow for straightforward manufacture. As used herein, the term 'substantially flat' means formed in a single plane and not wrapped around or otherwise confirmed to fit a curved or other non-planar shape. A flat heater may be easily handled during manufacture and may provide for robust construction.

The heater may be of the type described in EP-B1-2493342, the entire content of which is incorporated herein in its entirety. For example, the heater may comprise one or more electrically conductive tracks on an electrically insulating substrate. The electrically insulating substrate may comprise any suitable material, and may be a material that is able to tolerate high temperatures (in excess of 300° C.) and rapid temperature changes. An example of a suitable material is a polyimide film, such as Kapton®.

The heater may heat a small amount of liquid aerosol-forming substrate at a time. The heater may include, for example, a liquid passageway in communication with the liquid aerosol-forming substrate. The liquid aerosol-forming substrate may be forced into the liquid passageway by capillary force. The at least one heater may be arranged such that during use, only the small amount of liquid aerosol-forming substrate within the liquid passageway, and not the liquid within the housing, is heated. The heater may comprise a coil substantially surrounding at least a portion of a liquid passageway. The heater may comprise an inductive heater. Inductive heaters are described in more detail below, in relation to the cartridge.

The heater may comprise the vibratable element. This may reduce the number of component parts of the system and facilitate straightforward manufacture. This may ensure that the portion of liquid aerosol-forming substrate to be atomized (i.e. the portion received at the vibratable element) is at the desired (or alternatively a predetermined) temperature and viscosity at the time that the liquid aerosol-forming substrate is atomized. This may also enable the heater to operate at a lower temperature without reducing the temperature or the viscosity of the liquid aerosol-forming substrate being atomized. This is because the heater may heat a portion of the liquid aerosol-forming substrate, rather than all of the liquid aerosol-forming substrate held in the housing. Lowering the operating temperature of the heater may reduce the power requirements of the system.

The aerosol-generating system may further comprise a control system configured to operate the heater to heat liquid aerosol-forming substrate to a desired (or, alternatively a predetermined) temperature. The desired (or, alternatively a predetermined) temperature may be above ambient temperature. The desired (or, alternatively a predetermined) temperature may be above room temperature. This may reduce the viscosity of the aerosol-forming substrate compared to the viscosity of the unheated aerosol-forming substrate. This may increase the rate of atomization and may facilitate generation of an aerosol having desirable droplet sizes. This may reduce the sensitivity of the system to fluctuations in ambient temperature.

The desired (or, alternatively a predetermined) temperature may be below the vaporization temperature of the liquid aerosol-forming substrate. The desired (or, alternatively a predetermined) temperature may range from about 20° C. to about 80° C., range from about 30° C. to about 60° C., or range from about 35° C. to about 45° C. The desired (or, alternatively a predetermined) temperature may be range from about 20° C. to about 30° C., about 30° C. to about 40° C., about 40° C. to about 50° C., about 50° C. to about 60° C., about 60° C. to about 70° C., or about 70° C. to about 80° C.

As used herein, the term 'ambient temperature' is used to mean the air temperature of the surrounding environment in which the aerosol-generating system is being used. Ambient temperatures typically correspond to a temperature ranging from about 10° C. to about 35° C. As used herein, the term 'room temperature' is used to mean a standard ambient temperature and pressure, typically a temperature of about 25° C. and an absolute pressure of about 100 kPa (1 atm).

The control system configured to operate the heater may be separate of other control systems of the aerosol-generating system. The control system may be integral with other control system of the aerosol-generating system. The control system may comprise electric circuitry connected to the heater and to an electrical power source. The electric circuitry may be configured to monitor the electrical resistance of the heater and to control the supply of power to the heater dependent on the electrical resistance of the heater.

The electric circuitry may comprise a microprocessor, which may be a programmable microprocessor. The electric circuitry may comprise further electronic components. The electric circuitry may be configured to regulate a supply of power to the heater. Power may be supplied to the heater continuously following activation of the system or may be supplied intermittently, such as on a puff-by-puff basis. The power may be supplied to the heater in the form of pulses of electrical current.

The control system may comprise an ambient temperature sensor, to detect the ambient temperature. The control system may comprise a temperature sensor within the liquid storage portion, to detect the temperature of the liquid-aerosol-forming substrate held in the housing of the liquid storage portion. The one or more temperature sensors may be in communication with control electronics of the aerosol-generating system to enable the control electronics to maintain the temperature of the liquid aerosol-forming substrate at the desired (or, alternatively a predetermined) temperature. The one or more temperature sensors may be a thermocouple. The heater may be used to provide information relating to the temperature. Temperature dependent resistive properties of the heater may be known and used to determine the temperature of the at least one heater in a manner known to the skilled person.

The vibratable element may be a thin sheet. As used herein, 'thin' denotes a body having a thickness that is substantially smaller than the other dimensions of the body, such as length, width or diameter. The vibratable element may have a thickness of about 0.1 mm to about 4.0 mm. The vibratable element may have a longitudinal length or diameter of about 3 mm to about 60 mm.

As used herein, the term 'diameter' denotes the maximum dimension in the transverse direction of parts or portions of parts of the aerosol-generating system.

The vibratable element may be any suitable shape. The vibratable element may be substantially circular or elliptical. The vibratable element may be substantially triangular or square or any regular or irregular shape. The vibratable element may be substantially flat. The vibratable element may be curved. The vibratable element may be dome shaped. The vibratable element may be a substantially square plate. The vibratable element may be a substantially circular or elliptical disc.

The vibratable element may comprise a single piece of material. The vibratable element may comprise more than one piece of material. The vibratable element may be laminated. The vibratable element may comprise a metal or a metal alloy. The metal or metal alloy may be nickel, iron, titanium, copper or aluminium. The vibratable element may comprise a polymeric material. The vibratable element may comprise a ceramic material. The vibratable element may comprise a combination of materials.

The vibratable element may comprise an inlet side and an opposing outlet side, and each passage of the plurality of passages may extend between the inlet side and the outlet side.

The vibratable element may be reusable. The vibratable element may be disposable.

The passages of the plurality of passages are open passages that extend through the thickness of the vibratable element. The passages have open ends at the opposing inlet and outlet sides of the vibratable element. The passages may be formed in the vibratable element by any suitable method. Suitable methods of forming the passages include electrolysis and high-speed laser drilling.

The passages may have any suitable shape. The passages may have a substantially circular or elliptical cross-section. The passages may have a substantially triangular or square or an irregularly shaped cross-section.

The passages may have a substantially consistent diameter along their length. The passages may be substantially cylindrical. The passages may have a tapered shape with a width that narrows towards the outlet surface of the vibratable element. Providing passages with a larger diameter at the inlet side (i.e. the side receiving the liquid aerosol-forming substrate) than at the outlet side may facilitate uptake of the liquid-aerosol-forming substrate by the passageways. This may increase the rate of atomization of liquid aerosol-forming substrate.

The diameter of the tapered passages may substantially continuously decrease along the length of passages between the inlet and outlet sides. The diameter of the tapered passages may vary in one or more discrete step changes between the inlet and outlet sides. The tapered passages may be substantially frusto-conical, forming truncated cones. The tapered passages may be substantially truncated pyramids. The angle of taper may be constant along the length of the tapered passages. As used herein, the term 'angle of taper' is used to mean the angular deviation of the passage walls from the normal to the first or second surface of the vibratable element.

The passages may have a diameter at the outlet side of the vibratable element of about 1 micrometre (μm) to about 150 micrometres (μm), about 1 μm to about 50 μm, or about 1.5 μm to about 10 μm. This may facilitate generation of aerosols having desirable droplet sizes. The passages may have any suitable diameter at the outlet side of the vibratable element to generate droplets having a desired droplet size. The desired droplet size (MMAD) may be equal to or less than about 3 μm.

The passages may give rise to capillary action, so that in use, the liquid aerosol-forming substrate to be atomized is drawn into the passages, increasing the contact area between the vibratable element and the liquid aerosol-forming substrate. Where the heater comprises the vibratable element, improved conductive heat transfer between the vibratable element and the liquid aerosol-forming substrate may occur.

The plurality of passages may form an array. The array of passages may have any suitable shape. For example, the passages may be arranged in a substantially circular array, a substantially elliptical array, a substantially square array or a substantially rectangular array. The passages may be regularly spaced across the array. The passages may be irregularly spaced across the array.

The array of passages may extend across the entire vibratable element. The array of passages may extend over a portion of the vibratable element. The array of passages may extend over a central portion of the vibratable element. The array may cover an area of about 10% to about 100% of the area of the vibratable element, about 20% to about 80%, or about 30% to about 70%. The area of the array of passages may be less than or equal to about 25 $mm^2$. The array of passages may, for example, be rectangular and have dimensions of about 5 mm to about 2 mm. The array of passages may be substantially circular, having a diameter of about 3 mm to about 60 mm.

The plurality of passages may comprise about 100 to about 10000 passages, about 1000 to about 7000 passages, or about 3000 to about 5000 passages.

The actuator may be arranged at any suitable location with respect to the vibratable element. The actuator may be configured to transmit vibrations to the vibratable element at the inlet side or the outlet side of the vibratable element. The actuator may be configured to transmit vibrations to the vibratable element at the inlet side. The actuator may be configured to transmit vibrations to the vibratable element at the outlet side. The actuator may be in direct contact with the vibratable element. The actuator may be secured to the vibratable element. The actuator may be secured to the vibratable element by pressure. The actuator may be bonded to the vibratable element. A transfer member may be provided between the actuator and the vibratable element to transfer vibrations from the actuator to the vibratable element.

The actuator may be configured to vibrate the vibratable element in any suitable direction. The actuator may be configured to vibrate the vibratable element in a thickness direction. As used herein, 'thickness direction' means a direction substantially parallel to the thickness of the vibratable element. This may facilitate deformation in the vibratable element that encourages movement of liquid aerosol-forming substrate through the passages.

The actuator may comprise one or more actuating elements. The one or more actuating elements may be any suitable shape. The one or more actuating elements may be substantially circular or elliptical. The one or more actuating elements may be substantially triangular, square or any regular or irregular shape. The one or more actuating elements may be annular. The one or more actuating elements may substantially circumscribe the plurality of passages of the vibratable element. By circumscribing the plurality of passages, the one or more actuating elements may not cover an open end of the passages. The one or more actuating elements may be substantially flat. The one or more actuating elements may have a thickness of about 0.1 mm to about 5.0 mm. The one or more actuating elements may be a substantially annular disc. The outer diameter of the annular disc may be about 3 mm to about 60 mm and the inner diameter may be about 2 mm to about 59 mm.

The actuator may be any type of actuator configured to excite vibrations in the vibratable element. The actuator may comprise a piezoelectric transducer. The piezoelectric transducer may provide actuator that is sufficiently small, lightweight and easy to control for use in a handheld aerosol-generating system.

The piezoelectric transducer may comprise a monocrystalline material. The piezoelectric transducer may comprise quartz. The piezoelectric transducer may comprise a ceramic. The ceramic may comprise barium titanate ($BaTiO_3$). The ceramic may comprise lead zirconate titanate (PZT). The ceramic may include doping materials such as Ni, Bi, La, Nd or Nb ions. The piezoelectric transducer may be polarized. The piezoelectric transducer may be unpolarized. The piezoelectric transducer may comprise both polarized and unpolarized piezoelectric materials.

The aerosol-generating system may further comprise a control system configured to operate the actuator to excite vibrations in the vibratable element at a desired (or, alternatively a predetermined) frequency. The desired (or, alternatively a predetermined) frequency may be about 20 kHz to about 1500 kHz, about 50 kHz to about 1000 kHz, or about 100 kHz to about 500 kHz. This may provide a desired aerosol-output rate and a desired droplet size for a good experience.

The control system configured to operate the actuator may be separate of other control systems of the aerosol-generating system. The control system may be integral with other control system of the aerosol-generating system. The control system may comprise electric circuitry connected to the actuator and to an electrical power source.

The electric circuitry may comprise a microprocessor, which may be a programmable microprocessor. The electric circuitry may comprise further electronic components. The electric circuitry may be configured to regulate a supply of power to the actuator. Power may be supplied to the actuator continuously following activation of the system or may be supplied intermittently, such as on a puff-by-puff basis. The power may be supplied to the actuator in the form of pulses of electrical current.

The liquid storage portion of the aerosol-generating system may comprise a housing that is substantially cylindrical, wherein an opening is at one end of the cylinder. The housing of the liquid storage portion may have a substantially circular cross section. The housing may be a rigid housing. As used herein, the term 'rigid housing' is used to mean a housing that is self-supporting. The rigid housing of the liquid-storage portion may provide mechanical support to the heating means.

The liquid storage portion may further comprise a carrier material within the housing for holding the aerosol-forming substrate.

The liquid aerosol-forming substrate may be adsorbed or otherwise loaded onto a carrier or support. The carrier material may be made from any suitable absorbent plug or body, for example, a foamed metal or plastics material, polypropylene, terylene, nylon fibres or ceramic. The liquid aerosol-forming substrate may be retained in the carrier material prior to use of the aerosol-generating system. The liquid aerosol-forming substrate may be released into the carrier material during use. The liquid aerosol-forming substrate may be released into the carrier material immediately prior to use. For example, the liquid aerosol-forming substrate may be provided in a capsule. The shell of the capsule may melt upon heating by the heater and releases the liquid aerosol-forming substrate into the carrier material. The capsule may optionally contain a solid in combination with the liquid.

In at least one example embodiment, the liquid aerosol-forming substrate is held in capillary material. A capillary material is a material that actively conveys liquid from one end of the material to another. The capillary material may be oriented in the housing to convey liquid aerosol-forming substrate to the first side of the vibratable element. The capillary material may have a fibrous structure. The capillary material may have a spongy structure. The capillary material may comprise a bundle of capillaries. The capillary material may comprise a plurality of fibres. The capillary material may comprise a plurality of threads. The capillary material may comprise fine bore tubes. The capillary material may comprise a combination of fibers, threads and fine-bore tubes. The fibers, threads and fine-bore tubes may be generally aligned to convey liquid to the vibratable element. The capillary material may comprise sponge-like material. The capillary material may comprise foam-like material. The structure of the capillary material may form a plurality of small bores or tubes, through which the liquid can be transported by capillary action.

The capillary material may comprise any suitable material or combination of materials. Examples of suitable materials are a sponge or foam material, ceramic- or graphite-based materials in the form of fibers or sintered powders, foamed metal or plastics materials, a fibrous material, for example made of spun or extruded fibers, such as cellulose acetate, polyester, or bonded polyolefin, polyethylene, terylene or polypropylene fibres, nylon fibres, or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and atom pressure, which allow the liquid to be transported through the capillary material by capillary action. The capillary material may be configured to convey the aerosol-forming substrate to the first surface of the vibratable element. The capillary material may extend into passages of the vibratable element.

The carrier material may abut the vibratable element. The carrier material may abut the vibratable element at the inlet side. The capillary material may abut the vibratable element. The liquid aerosol-forming substrate may be transported by capillary action from the liquid storage portion to the vibratable element. By providing capillary material in abutment with the inlet side of the vibratable element, liquid aerosol-forming substrate from the liquid-storage portion may be delivered to the vibratable element regardless of the orientation of the aerosol-generating system.

The aerosol-generating system may comprise liquid aerosol-forming substrate in the housing of the liquid-storage portion. The liquid aerosol-forming substrate is a substrate capable of releasing volatile compounds that can form an aerosol. The volatile compounds may be released by moving the liquid aerosol-forming substrate through the passages of the vibratable element.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavor compounds, which are released from the aerosol-forming substrate upon heating. The liquid aerosol-forming substrate may comprise homogenized tobacco material. The liquid aerosol-forming substrate may comprise a non-tobacco-containing material. The liquid aerosol-forming substrate may comprise homogenized plant-based material.

The liquid aerosol-forming substrate may comprise at least one aerosol-former. An aerosol-former is any suitable known compound or mixture of compounds that facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavorants.

The aerosol-forming substrate may comprise nicotine and at least one aerosol former. The aerosol former may be glycerine. The aerosol-former may be propylene glycol. The aerosol former may comprise both glycerine and propylene glycol. The aerosol-forming substrate may have a nicotine concentration of about 2% to about 10%.

The aerosol-forming substrate may have a dynamic viscosity ($\mu$) at a temperature of 20° C. of about 0.4 mPa·S (0.4 mPl, 0.4 cP) to about 1000 mPa·S (1000 mPl, 1000 cP), about 1 mPa·S to about 100 mPa·S, or about 1.5 mPa·S to about 10 mPa·S.

The aerosol-generating system may comprise a power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more vaping experiences; for example, the power supply may have sufficient capacity to allow for the continuous generation of aerosol for a period of around six minutes, corresponding to the typical time taken to smoke a cigarette, or for a period that is a multiple of six minutes. In another example, the power supply may have sufficient capacity to allow for a desired (or, alternatively a predetermined) number of puffs or discrete activations of the heater and actuator.

The aerosol-generating system may be portable. The aerosol-generating system may have a size comparable to a cigar or cigarette. The aerosol-generating system may have a total length of about 30 mm to about 150 mm. The aerosol-generating system may have an external diameter of about 5 mm to about 30 mm.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity containing the power supply. The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to an adult vaper and may reduce the concentration of the aerosol before it is delivered to an adult vaper.

The aerosol-generating system may comprise an aerosol-generating device and a cartridge. The cartridge may comprise the liquid storage portion. The cartridge may comprise the liquid storage portion and at least a portion of the heater. The cartridge may comprise the liquid storage portion and the heater. The cartridge may comprise the liquid storage portion, the heater the vibratable element and the actuator.

A cartridge for an aerosol-generating system may comprise a liquid storage portion comprising a housing configured to hold a liquid aerosol-forming substrate; and a heater arranged to heat liquid aerosol-forming substrate to a desired (or, alternatively a predetermined) temperature.

According to at least one example embodiment, a cartridge for an aerosol-generating system comprises a liquid storage portion including a housing configured to hold a liquid aerosol-forming substrate; a heater configured to heat liquid aerosol-forming substrate to a desired (or, alternatively a predetermined) temperature; a vibratable element comprising a plurality of passages through which heated liquid aerosol-forming substrate may pass to form an aerosol; and an actuator configured to vibrate the vibratable element to generate the aerosol.

The liquid storage portion, the heater, the vibratable element, and the actuator may comprise any features or be arranged in any configuration as described above in relation to the liquid storage portion, the heater, the vibratable element and the actuator of the aerosol-generating system of the example embodiments described herein. For example, the heater may comprise the vibratable element.

The heater may be substantially as described above. The heater may be an inductive heater, such that no electrical contacts are formed between the cartridge and the device. The device may comprise an inductor coil and a power supply configured to provide high frequency oscillating current to the inductor coil. The cartridge may comprise a susceptor element configured to heat the aerosol-forming substrate. As used herein, a high frequency oscillating current means an oscillating current having a frequency of about 500 kHz to about 10 MHz.

The desired (or, alternatively a predetermined) temperature may be above ambient temperature. The desired (or, alternatively a predetermined) temperature may be above room temperature. The desired (or, alternatively a predetermined) temperature may be below the vaporization temperature of the liquid aerosol-forming substrate. The desired (or, alternatively a predetermined) temperature may be any suitable temperature for a vibratable element and actuator arrangement in accordance with the present invention to generate droplets having a desired droplet size. The desired droplet size (MMAD) may be equal to or less than about 3 μm. The desired (or, alternatively a predetermined) temperature may be about 20° C. to about 80° C., about 30° C. to about 60° C., or about 35° C. to about 45° C. The desired (or, alternatively a predetermined) temperature may be about 20° C. to about 30° C., about 30° C. to about 40° C., about 40° C. to about 50° C., about 50° C. to about 60° C., about 60° C. to about 70° C., or about 70° C. to about 80° C.

The cartridge may be removably coupled to the aerosol-generating device. The cartridge may be removed from the aerosol-generating device when the aerosol-forming substrate has been consumed. The cartridge may be disposable. The cartridge may be reusable. The cartridge may be refillable with liquid aerosol-forming substrate. The cartridge may be replaceable in the aerosol-generating device. The aerosol-generating device may be reusable.

The cartridge may be manufactured at low cost, and in a reliable and repeatable fashion. As used herein, the term 'removably coupled' is used to mean that the cartridge and device can be coupled and uncoupled from one another without significantly damaging either the device or cartridge.

The cartridge may have a simple design. The cartridge may have a housing within which an aerosol-forming substrate is held. The cartridge housing may be a rigid housing. As used herein 'rigid housing' means a housing that is self-supporting. The housing may comprise a material that is impermeable to liquid.

The cartridge may comprise a lid. The lid may be peelable before coupling the cartridge to the aerosol-generating device. The lid may be piercable.

The aerosol-generating device may comprise a cavity for receiving the cartridge. The aerosol-generating device may comprise a cavity for receiving the power supply.

The aerosol-generating device may comprise the heater. The aerosol-generating device may comprise at least a portion of the heater. The aerosol-generating device may comprise the vibratable element. The aerosol-generating device may comprise the actuator. The aerosol-generating device may comprise one or more control systems of the aerosol-generating system. The aerosol-generating device may comprise the power supply. The power supply may be removably coupled to the aerosol-generating device.

The aerosol-generating device may comprise a mouthpiece. The mouthpiece may comprise at least one air inlet and at least one air outlet. The mouthpiece may comprise more than one air inlet.

The aerosol-generating device may comprise a piercing element configured to pierce the lid of the cartridge. The mouthpiece may comprise the piercing element. The mouthpiece may comprise at least one first conduit extending between the at least one air inlet and a distal end of the piercing element. The mouthpiece may comprise at least one second conduit extending between a distal end of the piercing element and the at least one air outlet. The mouthpiece may be arranged such that in use, when an adult vaper draws on the mouthpiece, air flows along an airflow pathway extending from the at least one air inlet, through the at least one first conduit, through a portion of the cartridge, through the at least one second conduit and exits the at least one outlet. This may improve airflow through the aerosol-generating device and enable the aerosol to be delivered to the adult vaper more easily.

The aerosol-generating system may comprise a temperature sensor. The temperature sensor may be adjacent to the cavity for receiving the cartridge. The temperature sensor may be in communication with the control electronics to enable the control electronics to maintain the temperature of the heater at the desired (or, alternatively a predetermined) operating temperature. The temperature sensor may be a thermocouple, or alternatively the at least one heater may be used to provide information relating to the temperature. The temperature dependent resistive properties of the at least one heater may be known and used to determine the temperature of the at least one heater.

The aerosol-generating system may comprise a puff detector in communication with the control electronics. The puff detector may be configured to detect when an adult vaper draws on the mouthpiece. The control electronics may be configured to control power to the at least one heating element in dependence on the input from the puff detector.

The aerosol-generating system may comprise an adult vaper input, such as a switch or button. This enables the adult \taper to turn the system on. The switch or button may activate the heater. The switch or button may initiate the aerosol generation. The switch or button may prepare the control electronics to await input from the puff detector.

During vaping, an adult vaper may insert a cartridge as described herein into the cavity of an aerosol-generating device as described herein. The adult vaper may attach the mouthpiece to the main body of the aerosol-generating device, which may pierce the cartridge with the piercing portion. The adult vaper may activate the device by pressing the button. The adult vaper may then draw on the mouthpiece, which draws air into the device through the one or more air inlets, the air then passes through over the vibratable element, entraining the atomized aerosol-forming substrate into the airflow, and exits the device through the air outlet in the mouthpiece.

The aerosol-generating system may be an electrically operated vaping system. The aerosol-generating system may be an electronic cigarette.

The electrically operated vaping system may comprise liquid aerosol-forming substrates that; at ambient temperatures, are too viscous to be atomized by other ultrasonic atomisers. The heater may reduce the viscosity of the liquid aerosol-forming substrate before atomization.

At least one example embodiment relates to an atomizer for atomizing a liquid aerosol-generating substrate to generate an aerosol. The atomizer comprises: a heater configured to heat liquid aerosol-forming substrate; a vibratable element comprising a plurality of passages through which heated liquid aerosol-forming substrate may pass to form an aerosol; and an actuator configured to vibrate the vibratable element to generate the aerosol. The vibratable element and the heater may comprise any features or be arranged in any configuration as described above. For example, the heater may comprise the vibratable element.

A kit of parts may be provided, comprising an aerosol-generating device, a cartridge and an atomizer, substantially as described above. An aerosol-generating system may be provided by assembling the aerosol-generating device, the cartridge and the atomizer of the kit of parts. The components of the kit of parts may be removably connected. The components of the kit of parts may be interchangeable. Components of the kit of parts may be disposable. Components of the kit of parts may be reusable.

At least one example embodiment relates to a method of generating an aerosol. The method comprises: heating a liquid aerosol-forming substrate to a desired (or, alternatively a predetermined) temperature; receiving liquid aerosol-forming substrate heated to the desired (or, alternatively a predetermined) d temperature at a vibratable element having a plurality of passages; and vibrating the vibratable element to pass liquid aerosol-forming substrate through the passages to form an aerosol. The method may be performed using an aerosol-generating system, a cartridge or an atomizer.

Features of the vibratable element and variables, such as the desired (or, alternatively a predetermined) temperature and frequency of oscillation of the vibratable element, may be the same as those described in relation to other example embodiments.

Features described in relation to one example embodiment may also be applicable to another example embodiment.

BRIEF DESCRIPTION OF THE DRAWINGS

Embodiments will be further described, by way of example only, with reference to the accompanying drawings, in which.

DETAILED DESCRIPTION

Figure 1:
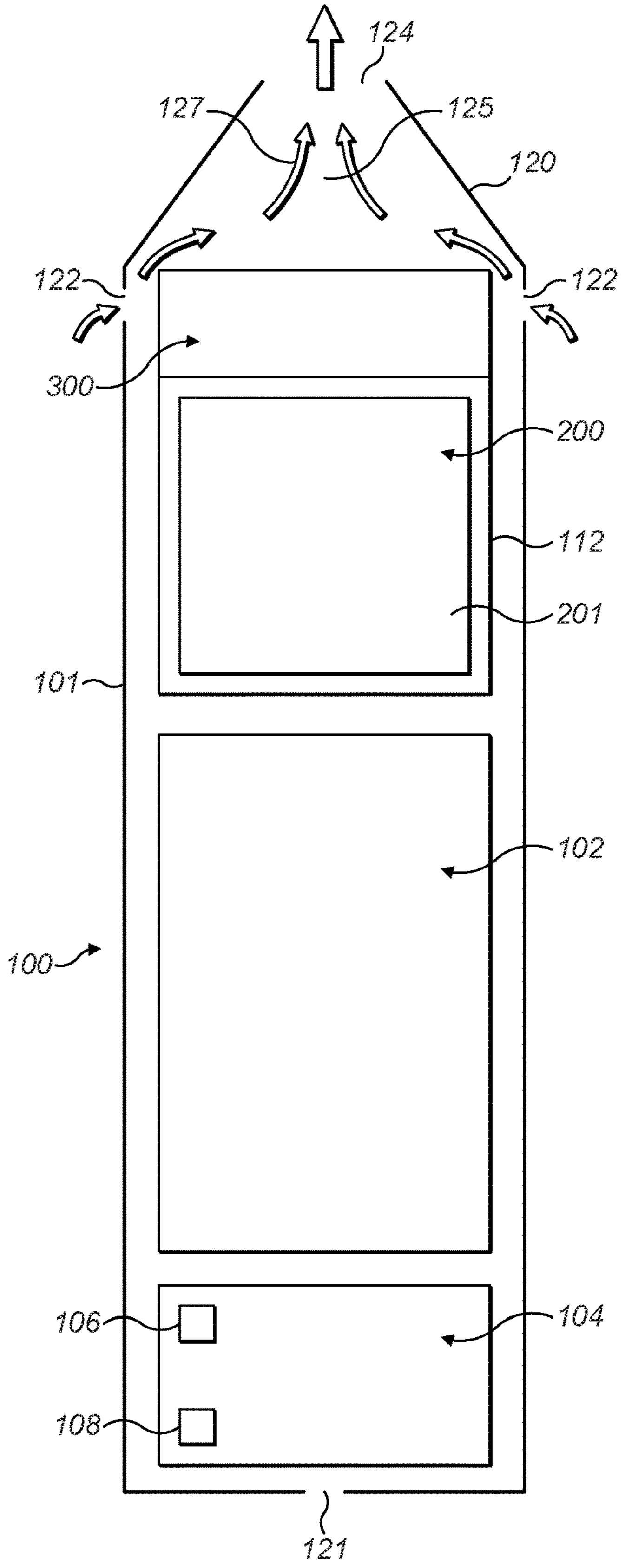
FIG. 1 is a schematic illustration of a first example embodiment of an aerosol-generating system.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc, may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device.

The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

FIG. 1 is a schematic view of a first example embodiment of an aerosol-generating system. FIG. 1 is schematic in nature. The components shown are not necessarily to scale either individually or relative to one another. The aerosol-generating system comprises an aerosol generating device 100, which is reusable, in cooperation with a cartridge 200, which is disposable. In FIG. 1, the system is an electrically operated vaping system.

The device 100 comprises a main body having a housing 101. The housing 101 is substantially circularly cylindrical and has a longitudinal length of about 100 mm and an external diameter of about 20 mm, comparable to, but not limited to, a cigar. In the device, there is provided an electric power supply in the form of battery 102 and control electronics 104. The main body housing 101 also defines a cavity 112 into which the cartridge 200 is received.

The cartridge 200 (shown in schematic form in FIG. 1) comprises a rigid housing defining a liquid storage portion 201. The liquid storage portion 201 holds a liquid aerosol-forming substrate (not shown). The housing of the cartridge 200 is fluid impermeable but has an open end (not shown) that is coverable by a removable lid (not shown) when the cartridge is removed from the device 100. The lid may be removed from the cartridge 200 before insertion of the cartridge into the device. The cartridge 200 includes keying features (not shown) to ensure the cartridge 200 cannot be inserted into the device upside-down.

The device 100 also includes a mouthpiece portion 120. The mouthpiece portion 120 is connected to the main body housing 101 by a hinged connection in this example embodiment, but any kind of connection may be used, such as a snap fitting or a screw fitting. The mouthpiece portion 120 comprises a plurality of air inlets 122, an air outlet 124, an aerosol forming chamber 125, and an atomizer 300 mounted therein (shown schematically in FIG. 1). Air inlets 122 are defined between the mouthpiece portion 120 and the main body housing 101 of the device 100 when the mouthpiece portion is in a closed position, as shown in FIG. 1. An air-flow route 127 is formed from the air inlets 122 to the air outlet 124 via the aerosol forming chamber 125 and the atomizer 300, as shown in FIG. 1 by the arrows.

Figure 2:
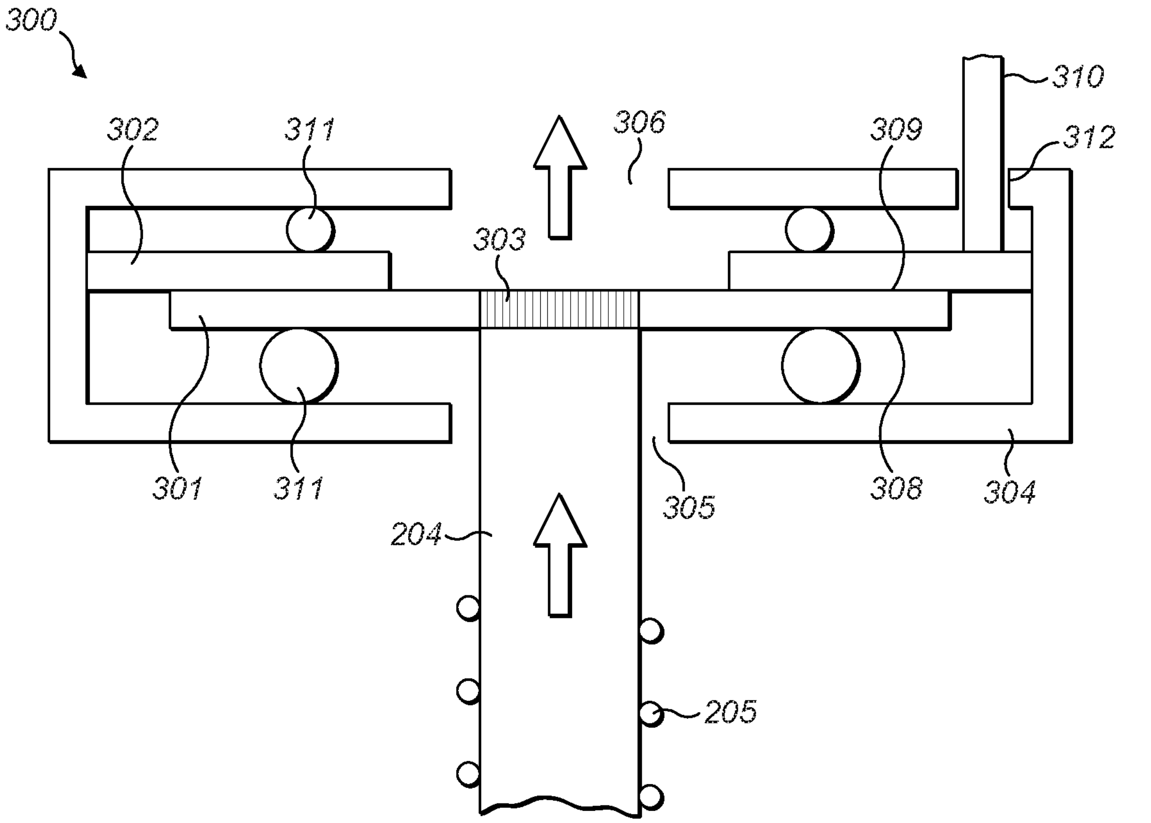
FIG. 2 illustrates a first example embodiment of an atomizer for an aerosol-generating system.

As shown in FIG. 2, the atomizer 300 comprises a vibratable element 301 and actuator 302 housed inside an atomizer housing 304. Atomizer housing 304 comprises a hollow cylindrical box, having an inlet opening 305 and an outlet opening 306 arranged in co-axial alignment at opposite sides of the housing 304. The housing 304 is removably connected to the mouthpiece 120 of the device 100 by a screw thread connection (not shown). A male screw thread (not shown) is provided at an outer surface of the atomizer housing 304, that is complimentary to a female screw thread (not shown) on an inner surface of the mouthpiece 120. Atomizer 300 is removable from the mouthpiece portion 120 of the device for disposal or for cleaning.

Vibratable element 301 comprises a substantially circular aluminium disc, having a thickness of about 2 mm and a diameter of about 15 mm.

A plurality of passages 303 extend from an inlet side 308 to an opposing outlet side 309 of the vibratable element. The plurality of passages form an array having a substantially circular shape. The substantially circular array has a diameter of about 7 mm, and is arranged substantially centrally in the element 301.

The passages (not shown) have a substantially circular cross-section and are tapered from the inlet side 308 to the outlet side 309 of the vibratable element 301. The passages have a diameter at the inlet side of about 8 μm and a diameter at the outlet side of about 6 μm. The passages are typically formed by high-speed laser drilling. The plurality of passages is comprised of about 4000 passages arranged with equal spacing across the array.

Actuator 302 comprises a piezoelectric transducer. The piezoelectric transducer is a substantially circular annular disc of piezoelectric material, typically zirconate titanate (PZT). The piezoelectric transducer has a thickness of about 2 mm, an outer diameter of about 17 mm, and an inner diameter of about 8 mm.

As shown in FIG. 2, the actuator 302 is in direct contact with the vibratable element 301, at the outlet side 309 of the vibratable element. The inner diameter of the piezoelectric transducer 302 circumscribes the array of passages 303 of the vibratable element 301, such that the open ends of the passages at the outlet side are not covered by the piezoelectric transducer 302. In other embodiments (not shown) it is envisaged that the piezoelectric transducer 302 may be in direct contact with the vibratable element 301 at the inlet side 308.

The vibratable element 301 and piezoelectric transducer 302 are supported within the atomizer housing 304 by a pair of elastomeric O-rings 311, which allow the vibratable element 301 and the piezoelectric transducer 302 to vibrate within the housing 304. The vibratable element 301 and piezoelectric transducer 302 are held together by pressure from the opposing O-rings 311. In other example embodiments (not shown) the vibratable element 301 and the piezoelectric transducer 302 may be bonded by any suitable means, such as an adhesive layer.

The vibratable element 301 and the piezoelectric transducer 302 are arranged within the atomizer housing 304 such that the array of passages 303 is in coaxial alignment with the inlet and outlet openings 305, 306 of the housing 304.

One or more spring pins 310 extend through an opening 312 in the atomizer housing 304 to provide electrical connection of the piezoelectric transducer 302 to the control electronics 104 and the battery 102 of the device 100. The one or more spring pins 310 are held in contact with the piezoelectric transducer 302 by pressure, rather than by a mechanical connection so that good electrical contact is maintained during vibration of the piezoelectric transducer 302.

When the atomizer 300 is removably connected to the mouthpiece portion 120 of the device 100 and the cartridge 200 is received in the cavity 112 of the device, an elongate capillary body (not shown in FIG. 1) extends from the liquid storage portion 201 of the cartridge 200 to the atomizer 300 to fluidly connect the cartridge 200 to the atomizer 300. As shown in FIG. 2, the elongate capillary body 204 extends into the atomizer housing 304 and abuts the inlet side 308 of the vibratable element 301 at the array of passages 303. The heater is provided in the liquid storage portion in the form of a coil heater 205 surrounding the capillary body 204. Note that the coil heater is only shown schematically in FIG. 2. The coil heater 205 is connected to the electric circuitry 104 and battery 102 of the device 100 via connections (not shown), which may pass along the outside of the liquid storage portion 200, although this is not shown in FIG. 1 or FIG. 2.

The liquid aerosol-forming substrate (not shown) is conveyed by capillary action from the liquid storage portion 201 from the end of the capillary body 204 which extends into the liquid storage portion 201, past the heater coil 205, and to the other end of the capillary body 204, which extends into the atomizer housing 304 and abuts the vibratable element 301 at the inlet side 308 at the array of passages 303.

When an adult vaper draws on the air outlet 124 of the mouthpiece portion 120, ambient air is drawn through air inlets 122. In the embodiment of FIG. 1, a puff detection device 106 in the form of a microphone, is also provided as part of the control electronics 104. A small air flow is drawn through a sensor inlet 121 in the main body housing 101, past the microphone 106 and up into the mouthpiece portion 120. When a puff is detected by the electric circuitry 104, the electric circuitry 104 activates the heater coil 205 and the piezoelectric transducer 302. The battery 102 supplies electrical energy to the coil heater 205 to heat the capillary body 204 surrounded by the coil heater. The battery 102 further supplies electrical energy to the piezoelectric transducer 302, which vibrates, deforming in the thickness direction. The piezoelectric transducer 302 typically vibrates at about 150 kHz. The piezoelectric transducer 302 transmits the vibrations to the vibratable element 301, which vibrates, also deforming in the thickness direction. A light emitting diode (LED) 108 is also activated to indicate that the device is activated.

The coil heater 205 heats the liquid aerosol-forming substrate being conveyed along the capillary body, past the coil heater 205, to a desired (or, alternatively a predetermined) temperature of about 45° C.

The vibrations in the vibratable element deform the plurality of passages 303, which draws heated liquid aerosol-forming substrate from the capillary body 204, through the plurality of passages 303 at the inlet side 308 of the vibratable element 301, and ejects atomized droplets of liquid aerosol-forming substrate from the passages at the outlet side 309 of the vibratable element 301, forming an aerosol. At the same time, the heated liquid being atomized is replaced by further liquid moving along the capillary body 204 by capillary action. (This is sometimes referred to as 'pumping action'). The aerosol droplets ejected from the vibratable element 301 mix with and are carried in the air flow 127 from the inlets 122 in the aerosol forming chamber 125, and are carried towards the air outlet 124 of the mouthpiece 120 for inhalation by the user.

In the embodiment shown in FIG. 1, the electric circuitry 104 is programmable, and can be used to manage the aerosol generating operation.

Figure 3:
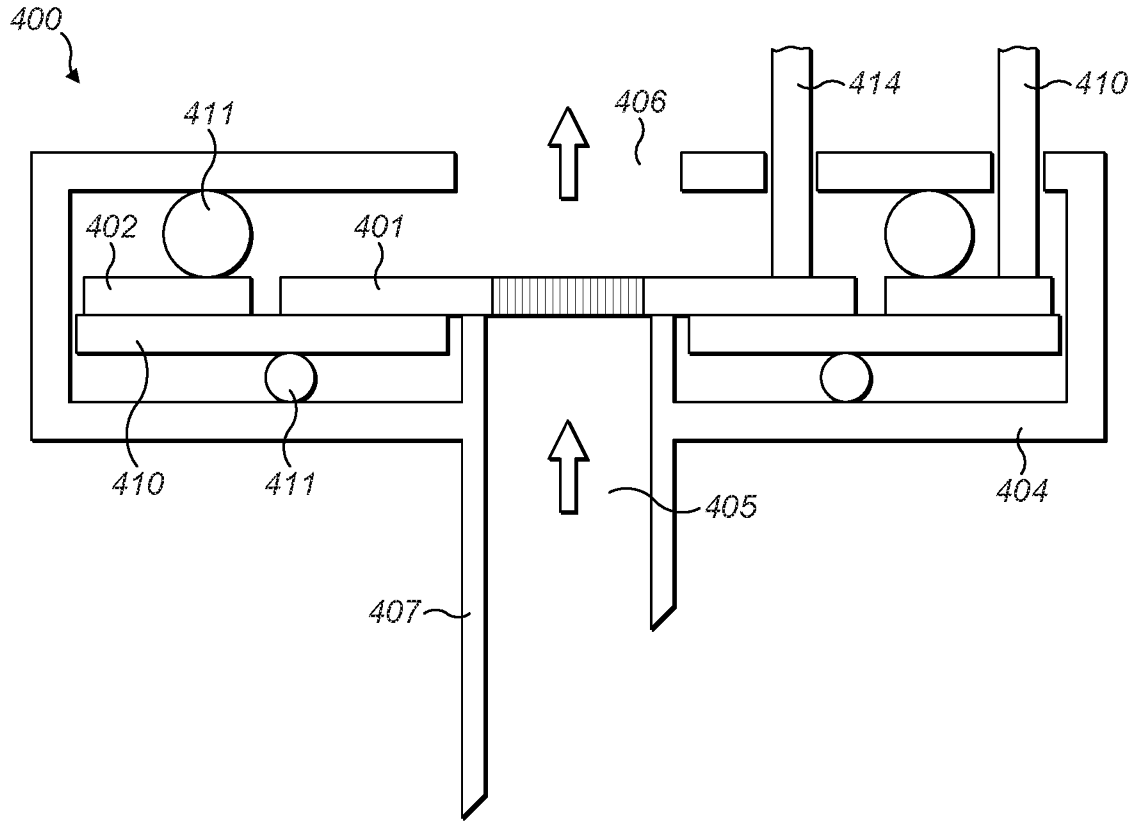
FIG. 3 illustrates a second example embodiment of an atomizer for an aerosol-generating system.

In at least one example embodiment, an atomizer for use in the system of FIG. 1, is shown in FIG. 3. The atomizer 400 has a similar construction and size to the atomizer 300 shown in FIG. 2. However, the atomizer 400 is provided with a washer 410 within the housing 404, on which the vibratable element 401 and the piezoelectric transducer 402 are supported. The washer 410 transmits vibrations from the piezoelectric element 402 to the vibratable element 401.

In at least one example embodiment, the vibratable element has a smaller diameter of about 12 mm. The actuator is not arranged over the vibratable element and, therefore, has a larger inner diameter of about 14 mm.

The washer 410 is a substantially circular annular disc, having a thickness of about 2 mm, an outer diameter of about 17 mm, and an inner diameter of about 10 mm. The vibratable element 401 and the piezoelectric transducer are bonded to one side of the washer 410 by an adhesive layer (not shown). The washer 410 is bonded to the vibratable element 401 at the inlet side 408. The piezoelectric transducer 402 substantially circumscribes the vibratable element 401. A pair of O-rings 411, similar to the pair of O-rings 311 of the atomizer 300 shown in FIG. 2, supports the vibratable element 401, the piezoelectric transducer 402 and the washer 410 in the atomizer housing 404.

In other example embodiments (not shown) the vibratable element 401, the piezoelectric transducer 402, and the washer 410 may be arranged differently. The washer 410 may be bonded to the vibratable element 401 at the outlet side 409. The vibratable element 401 may be secured to the washer 410 at the opposite side to the piezoelectric transducer 402.

The piezoelectric transducer is electrically connected to the control electronics 104 and the battery 102 of the device 100 by one or more spring pins 410 extending through one or more openings in the atomizer housing 404.

In at least one example embodiment, the vibratable element 401 is also electrically connected to the control electronics 104 and the battery 102 of the device 100, so that the vibratable element 401 may form a resistive heating element. As such, the heater of the system comprises the vibratable element 401. Electrical connection of the vibratable element 401 with the control electronics 104 and the battery 102 is achieved by one or more second spring pins 414 extending through one or more openings in the housing 404 of the atomizer 400. The one or more second spring pins 414 are held in contact with the vibratable element 401 by pressure, rather than by a mechanical connection so that a the electrical connection remains during vibration of the vibratable element 401.

In at least one example embodiment, a capillary body does not fluidly connect the atomizer 400 to the liquid storage portion 201 of the cartridge 200. Instead, liquid aerosol-forming substrate (not shown) is free to flow from the liquid storage portion 201 of the cartridge 200 to the vibratable element 401 of the atomizer 400 via an inlet opening 405 in the atomizer housing 404. The housing 404 of the atomizer 400 further comprises piercing means 401, for piercing a lid of a cartridge (not shown) on insertion of a sealed cartridge into the device 100. The piercing element 407 is a substantially circularly cylindrical tube arranged to guide liquid aerosol-forming substrate from the liquid storage portion (not shown) to the vibratable element 401. The piercing element 407 extends into the housing 404 from the inlet opening 405 to the inlet side of the vibratable element 401. The piercing element 407 extends out of the housing from the inlet opening 405 by about 6 mm. The distal end of the piercing element is angled to form a sharp point to facilitate piercing of a cartridge lid.

The atomizer 400 operates in a substantially similar manner to the atomizer 300 shown in FIG. 2. However, power is supplied from the battery 102 to the vibratable element 401 for heating the vibratable element 401, and free flowing liquid aerosol-forming substrate (not shown) at the inlet side of the vibratable element 401 is heated by the vibratable element 401 to a desired (or, alternatively a predetermined) temperature of about 45'C. Heated liquid aerosol-forming substrate at the inlet side of the vibratable element 401 is drawn into the plurality of passages by the vibrations of the vibratable element 401, passes through the passages and is atomised substantially as described above and exits the atomizer 400 via the outlet opening 406 in the atomizer housing 404.

In other embodiments (not shown), a plunger or other similar type of device may be provided at the end of the cartridge 200 opposite the opening, such that liquid aerosol-forming substrate may be moved into contact with the vibratable element, regardless of the orientation of the device.

In other example embodiments (not shown), the heater may not comprise the vibratable element, but rather the heater may be provided at another location in or on the atomizer 400. For example, the heater may be provided in or on the atomizer housing 404, on or around the piercing element 407, on the washer 410 of the atomizer 400 or on the vibratable element 401. Where the heater is provided on the vibratable element 401, the vibratable element may be heated by the heater to further facilitate heating of the liquid aerosol-forming substrate. The heater may be any suitable heater, as described in more detail above.

In other example embodiments (not shown), the atomizer 300 may be removably connected to the main body housing 101 of the device 100. The atomizer 300 may be arranged in the cavity 112 for receiving the cartridge 200. The atomizer may be arranged at the distal end of the cavity 112, such that the cartridge 200 may be inserted and removed from the main body at the mouthpiece end. One or more air inlets 122 may be arranged distally of the vibratable element in the main body housing 101, and an airflow pathway may be provided between the air inlets 122, the atomizer 300 and the output 124 of the mouthpiece 120, such that when an adult vaper draws on the mouthpiece 120, air enters the main body housing 101 at the one or more air inlets 122, passes over the atomizer 300, entraining aerosol generated by the atomizer, and passes through the device 100 to the mouthpiece.

In other example embodiments (not shown), the cartridge may comprise the atomizer 300, including the vibratable element 301 and the piezoelectric transducer 302. Contacts may be provided in the cartridge 200 and in the device 100 to connect the control electronics 104 and the battery 102 to the atomizer 300 in the cartridge 200.

In other example embodiments (not shown), the device 100 may include one or more secondary air inlets arranged to draw in additional ambient air to reduce the temperature of the aerosol entrained in the airflow and to dilute the aerosol before inhalation by the user.

In other example embodiments (not shown), the heater may be an inductive heater, such that no electrical contacts are formed between the cartridge and the device. The cartridge may comprise a susceptor element positioned to heat the aerosol-forming substrate. The device may comprise an inductor coil and the control electronics 104 and power supply 102 may be configured to provide high frequency oscillating current to the inductor coil to induce current in the susceptor element.

In other example embodiments (not shown), the heater may be provided in the cavity 112 of the device 100.

The invention claimed is:

1. An aerosol-generating system comprising:

a liquid-storage portion including, a housing configured to store a liquid aerosol-forming substrate;

an atomizer removably coupled to the liquid storage portion, the atomizer defining an atomizer housing including, an upper wall, a lower wall opposite the upper wall and defining an inlet opening, a washer, a vibratable element directly coupled to a first side of the washer with an adhesive, the vibratable element including, a plurality of passages through which heated liquid aerosol-forming substrate passes, each of the plurality of passages having an inlet and an outlet, the inlet of each of the plurality of passages having a larger diameter than the outlet of each of the plurality of passages, an actuator configured to vibrate the vibratable element and generate an aerosol, the vibratable element being planar and the actuator being directly coupled to the first side of the washer with an adhesive, the actuator being a circular annular disc having an inner disc diameter, the inner disc diameter of the circular annular disc circumscribes the vibratable element, a pair of o-rings including a first o-ring in direct contact with a top surface of the actuator and a second o-ring in direct contact with a second side of the washer, the first o-ring and the second o-ring arranged opposite each other to hold the washer, the actuator, and the vibratable element together by pressure, and a piercing element extending from the inlet opening in the lower wall adjacent an inlet side of the vibratable element to the liquid-storage portion, the piercing element configured to pierce the liquid-storage portion and guide the liquid aerosol-forming substrate from the liquid-storage portion to the vibratable element and the piercing element directly attached to the lower wall; and a control system including a power source electrically coupled to the vibratable element via a first spring pin, the first spring pin extending from an opening in the upper wall of the atomizer housing, the vibratable element forming a resistive heating element in response to receiving power from the power source and heating the liquid aerosol-forming substrate.

2. The aerosol-generating system of claim 1, wherein the control system is configured to operate the resistive heating element so as to heat the liquid aerosol-forming substrate to a desired temperature.

3. The aerosol-generating system of claim 1, wherein the vibratable element comprises:

an outlet side opposing the inlet side, each passage of the plurality of passages extending from the inlet side to the outlet side.

4. The aerosol-generating system of claim 3, wherein the actuator is configured to transmit vibrations to the vibratable element to the inlet side or the opposing outlet side of the vibratable element.

5. The aerosol-generating system of claim 1, wherein the actuator comprises:

a piezoelectric transducer.

6. The aerosol-generating system of claim 1, wherein the aerosol-generating system further comprises:

a cartridge including the liquid-storage portion.

7. The aerosol-generating system of claim 1, wherein the aerosol-generating system is an electrically operated vaping system.

8. The aerosol-generating system of claim 1, wherein the inner disc diameter of the circular annular disc circumscribes the plurality of passages.

9. The aerosol-generating system of claim 1, further comprising:
a capillary body extending from the liquid-storage portion.

10. The aerosol-generating system of claim 1,
wherein the actuator is electrically coupled to the control system via a second spring pin configured to extend through another opening in the atomizer housing.

11. The aerosol-generating system of claim 1,
wherein the inlet opening is configured to fluidly couple the liquid-storage portion to the vibratable element.

12. The aerosol-generating system of claim 1, wherein the liquid aerosol-forming substrate is drawn from the liquid-storage portion through the piercing element to the inlet side of the vibratable element by vibrations of the vibratable element.

13. The aerosol-generating system of claim 1, wherein the piercing element is a cylindrical tube, a distal end the piercing element including an angled end.

14. The aerosol-generating system of claim 1, wherein the atomizer housing includes at least two sidewalls between the upper wall and the lower wall.

15. A cartridge for an aerosol-generating system, the cartridge comprising:
a liquid storage portion including,
a housing configured to hold a liquid aerosol-forming substrate;
an atomizer removably coupled to the liquid storage portion, the atomizer defining an atomizer housing including,
an upper wall;
a lower wall opposite the upper wall and defining an inlet opening;
a washer,
a vibratable element in directly coupled to a first side of the washer with an adhesive, the vibratable element including,
a plurality of passages through which heated liquid aerosol-forming substrate passes, each of the plurality of passages having an inlet and an outlet, the inlet of each of the plurality of passages having a larger diameter than the outlet of each of the plurality of passages,
an actuator configured to vibrate the vibratable element to generate an aerosol, the vibratable element being planar and the actuator being directly coupled to the first side of the washer with an adhesive, the actuator being a circular annular disc having an inner disc diameter, the inner disc diameter of the circular annular disc circumscribes the vibratable element,
a pair of o-rings including a first o-ring in direct contact with a top surface of the actuator and a second o-ring in direct contact with a second side of the washer, the first o-ring and the second o-ring arranged opposite each other to hold the washer, the actuator, and the vibratable element together by pressure, and
a piercing element extending from the inlet opening in the lower wall adjacent an inlet side of the vibratable element to the liquid storage portion, the piercing element configured to pierce the liquid storage portion and guide the liquid aerosol-forming substrate from the liquid storage portion to the vibratable element and the piercing element directly attached to the lower wall; and
a control system including a power source electrically coupled to the vibratable element via a first spring pin, the first spring pin extending from an opening in the upper wall of the atomizer housing, the vibratable element forming a resistive heating element in response to receiving power from the power source and heating the liquid aerosol-forming substrate.

16. A vaporizer for vaporizing a liquid aerosol-generating substrate to generate an aerosol, the vaporizer comprising:
a housing including,
an upper wall, and
a lower wall opposite the upper wall and defining an inlet opening;
a washer;
a vibratable element directly coupled to a first side of the washer with an adhesive, the vibratable element including,
a plurality of passages through which heated liquid aerosol-generating substrate passes, each of the plurality of passages having an inlet and an outlet, the inlet of each of the plurality of passages having a larger diameter than the outlet of each of the plurality of passages;
an actuator configured to vibrate the vibratable element to generate an aerosol, the vibratable element being planar and the actuator being directly coupled to the first side of the washer with an adhesive, the actuator being a circular annular disc having an inner disc diameter, the inner disc diameter of the circular annular disc circumscribes the vibratable element;
a pair of o-rings including a first o-ring in direct contact with a top surface of the actuator and a second o-ring in direct contact with a second side of the washer, the first o-ring and the second o-ring arranged opposite each other to hold the washer, the actuator, and the vibratable element together by pressure;
a piercing element extending from the inlet opening in the lower wall adjacent an inlet side of the vibratable element to a liquid storage portion, the piercing element configured to pierce the liquid storage portion and guide the liquid aerosol-forming substrate from the liquid storage portion to the vibratable element and the piercing element directly attached to the lower wall; and
a control system including a power source electrically coupled to the vibratable element via a first spring pin, the first spring pin extending from an opening in the upper wall of the housing, the vibratable element forming a resistive heating element in response to receiving power from the power source and heating the liquid aerosol-generating substrate.

17. The vaporizer of claim 16, further comprising:
a liquid storage portion including a housing configured to hold the liquid aerosol-generating substrate.

18. A method of generating an aerosol, the method comprising:
heating a liquid aerosol-forming substrate;
receiving the heated liquid aerosol-forming substrate at a vibratable element through an inlet opening defined in a lower wall of a housing, the vibratable element having a plurality of passages, each of the plurality of passages having an inlet and an outlet, the inlet of each of the plurality of passages having a larger diameter than the outlet of each of the plurality of passages, a piercing element extending from the inlet opening adjacent an inlet side of the vibratable element to a liquid storage portion, the piercing element configured to pierce the liquid storage portion and guide the liquid aerosol-forming substrate from the liquid storage portion to the vibratable element and the piercing element directly attached to the lower wall; and vibrating the vibratable element with an actuator to move the liquid aerosol-forming substrate through the passages to form an aerosol, the vibratable element being planar, the vibratable element and the actuator being directly coupled to a first side of a washer with an adhesive, a top surface of the actuator being in direct contact with a first o-ring of a pair of o-rings and a second side of the washer being in direct contact with a second o-ring, the first o-ring and the second o-ring arranged opposite each other to hold the washer, the actuator, and the vibratable element together by pressure, the vibratable element being electrically coupled to a control system and a power source via a first spring pin, the first spring pin extending through an opening in an upper wall of the housing opposite the lower wall, the vibratable element forming a resistive heating element in response to receiving power from the power source and heating the liquid aerosol-forming substrate.

19. The aerosol-generating system of claim 1, wherein the vibratable element comprises a circular disc, and the circular disc defines the plurality of passages.

20. The aerosol-generating system of claim 19, wherein the circular disc is 2 mm thick and has a diameter of 15 mm.

21. The method of claim 18, wherein the actuator is electrically coupled to the control system via a second spring pin.

22. The method of claim 18, further comprising:

operating the resistive heating element to heat the liquid aerosol-forming substrate to a desired temperature.

23. The method of claim 18, wherein the vibratable element comprises:

an outlet side opposing the inlet side, each passage of the plurality of passages extending from the inlet side to the outlet side.

24. The method of claim 23, further comprising:

transmitting vibrations to the inlet side or the opposing outlet side of the vibratable element.

* * * * *